(12) United States Patent
Galletta, Jr.

(10) Patent No.: US 11,407,658 B2
(45) Date of Patent: *Aug. 9, 2022

(54) PASSIVE GRAVITY FILTER CELL AND METHODS OF USE THEREOF

(71) Applicant: Robby Galletta Enterprises LLC, Savannah, GA (US)

(72) Inventor: Robert J. Galletta, Jr., Savannah, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/804,422

(22) Filed: Feb. 28, 2020

(65) Prior Publication Data

US 2020/0198993 A1 Jun. 25, 2020

Related U.S. Application Data

(63) Continuation of application No. 15/363,658, filed on Nov. 29, 2016, now Pat. No. 10,662,080.

(51) Int. Cl.
*C02F 1/40* (2006.01)
*B01D 21/00* (2006.01)
(Continued)

(52) U.S. Cl.
CPC ............ *C02F 1/40* (2013.01); *B01D 17/0214* (2013.01); *B01D 21/0009* (2013.01);
(Continued)

(58) Field of Classification Search
CPC ............ B01D 21/0087; B01D 17/0214; B01D 21/0009; B01D 21/0012; C02F 1/40; C02F 2001/007; C02F 2101/32
See application file for complete search history.

(56) References Cited

U.S. PATENT DOCUMENTS

| 1,856,552 A | 5/1932 | Showers et al. |
| 3,129,157 A | 4/1964 | Loeckenhoff |

(Continued)

FOREIGN PATENT DOCUMENTS

| FR | 487155 A | 10/1917 |
| GB | 470315 | 8/1937 |

(Continued)

OTHER PUBLICATIONS

Office Action issued in corresponding Japanese Application No. 2019-548541 dated Aug. 31, 2021.

*Primary Examiner* — Walter D. Griffin
*Assistant Examiner* — Cameron J Allen
(74) *Attorney, Agent, or Firm* — Mathew L. Grell; Grell & Watson Patent Attorneys LLC

(57) ABSTRACT

A passive filter cell having a basin with a floor and two or more vertical or upright sidewalls forming chute or container having first or left sidewall, second or right sidewall, and third or back sidewall, and fourth or front downwardly curved sidewall, an inlet positioned proximate a top of the fourth or front sidewall and an outlet positioned proximate the top of the third or back sidewall, wherein the floor is configured angled from the fourth or front sidewall to the third or back sidewall, discharge pipe positioned proximate junction between the floor and the third or back sidewall, and lip configured to extend from the top of the third or back sidewall into an interior of the basin.

28 Claims, 8 Drawing Sheets

(51) Int. Cl.
*B01D 17/02* (2006.01)
*C02F 1/00* (2006.01)
*C02F 101/32* (2006.01)

(52) U.S. Cl.
CPC ..... *B01D 21/0012* (2013.01); *B01D 21/0087* (2013.01); *C02F 2001/007* (2013.01); *C02F 2101/32* (2013.01)

(56) References Cited

U.S. PATENT DOCUMENTS

| | | | |
|---|---|---|---|
| 4,000,075 A * | 12/1976 | Wooh | B01D 21/06 210/525 |
| 4,111,805 A | 9/1978 | Van Pool et al. | |
| 4,132,645 A | 1/1979 | Bottomley et al. | |
| 4,132,652 A | 1/1979 | Anderson et al. | |
| 4,208,291 A | 6/1980 | Ochoa | |
| 4,234,544 A | 11/1980 | Christman | |
| 4,247,312 A | 1/1981 | Thakur et al. | |
| 4,326,952 A | 4/1982 | Blake | |
| 4,780,206 A | 10/1988 | Beard et al. | |
| 4,876,004 A | 10/1989 | Verhoeff | |
| 5,458,770 A | 10/1995 | Fentz | |
| 5,503,747 A * | 4/1996 | Vion | B01D 17/00 210/519 |
| 5,560,826 A | 10/1996 | Szereday et al. | |
| 5,637,234 A | 6/1997 | McCasland | |
| 5,679,265 A | 10/1997 | Van Schie | |
| 5,993,646 A | 11/1999 | Powers | |
| 6,099,743 A | 8/2000 | Pedersen | |
| 6,132,609 A | 10/2000 | Chang et al. | |
| 6,824,696 B1 | 11/2004 | Tolmie et al. | |
| 8,968,579 B2 | 3/2015 | Bjornson et al. | |
| 10,662,080 B2 * | 5/2020 | Galletta, Jr. | C02F 1/40 |
| 2009/0321251 A1 * | 12/2009 | Rigby | C02F 1/4602 204/229.6 |
| 2011/0127205 A1 * | 6/2011 | Schlederer | B01D 21/0063 210/209 |
| 2014/0034504 A1 | 2/2014 | Sams et al. | |
| 2015/0068969 A1 | 3/2015 | Stagg et al. | |
| 2016/0106057 A1 | 4/2016 | DeWaard | |

FOREIGN PATENT DOCUMENTS

| | | | |
|---|---|---|---|
| JP | S48-42177 | 5/1973 | |
| JP | H 07-034903 U | 6/1995 | |
| WO | WO-2010089195 A2 * | 8/2010 | C02F 3/2846 |

* cited by examiner

PASSIVE GRAVITY FILTER CELL AND METHODS OF USE THEREOF

CROSS-REFERENCE TO RELATED APPLICATIONS

This application is a continuation of U.S. patent application Ser. No. 15/363,658, filed on Nov. 29, 2016, entitled "Passive Gravity Filter Cell and Methods of Use Thereof", which is incorporated herein by reference in its entirety.

FIELD OF THE INVENTION

This disclosure relates to a passive filter cell and methods of use thereof. More specifically the disclosure relates to a passive gravity filter cell or array of cells equipped with a charged particle device.

BACKGROUND

Waste water treatment and other fluid conditioning is a process to convert, treat, or condition a liquid waste, which is no longer suitable for its intended use, into an effluent that can be reused after treatment—removing impurities, suspended solids, and contaminants from water being treated or returned to water cycle with minimal environmental impact (water reclamation).

Known types of wastewater treatment include: clarifiers, skimmers, and oil-water and sludge separators.

Clarifiers, as used in the wastewater industry are devices that are designed to do just what their name implies; they separate matter that is suspended in the liquid, thereby "clarifying" the water. Working on the principle that nothing is exactly the same weight as water, these units allow for the water to pool slowly letting the suspended matter that is heavier than water sink to the bottom where it is collected as sludge. Matter that is lighter than water is allowed to float to the top and either evaporates or is collected as scum by a simple skimmer device. While many effective designs have existed over the years, they are for the most part large unwieldy shapes and are usually constructed as in-ground structures or settling tanks with mechanical means for continuous movement of the wastewater. One disadvantage of clarifiers is shape and unwieldy mechanical means prohibit them from being portable. Another disadvantage of the clarifier is the design is set before construction commences, so current design clarifiers cannot easily be modified or expanded. Imagine trying to change the shape or capacity of an in ground swimming pool once it is already built. Another disadvantage of clarifiers is the energy required to pump the wastewater into the tank and the energy required to stir the wastewater results in large electrical energy requirement to operate the clarifier. Another disadvantage of the clarifier is the tanks are large and require acreage to construct the wastewater clarifier and the wastewater mixture releases odorous gases requiring the clarifier be placed remotely from the waste source or public requiring waste water transmission over great distances.

Skimmers are devices that catch or collect contaminated floating top layer of oil or oil substances floating on a liquid surface—the separation of a contaminated top layer. Skimmers include floating oil or oil substance absorbents and paddles in the path of the flowing liquid, for example, as it moves through a tank. One disadvantage of skimmers is they restrict flow and create turbulent flow pattern.

Oil-water and sludge separators includes a basin where a flow of effluent is supplied to the basin and wherein the flow is directed around one or more baffles whether divergent, deflectors, or resistance to flow, which create a heavy turbulence in the flow and transform a substantial part of the energy of flow into energy in the whirls which create the turbulence. The turbulence increases the creation of sludge flocs and the succeeding sedimentation of these. One disadvantage is eddy currents of turbulence help suspend some solids or minerals in the liquid and enable the liquid to hold on to these solids.

Therefore, it is readily apparent that there is a need for a passive gravity filter cell and methods of use thereof that functions to enable a combination of features including the calm flow of liquid with suspended solids without turbulence, little to no restriction of flow of liquid carrying suspended solids, low energy requirement, small acreage requirement, and thus, to improve the performance of removal of suspended solids from effluent.

SUMMARY

Briefly described, in an example embodiment, the present disclosure overcomes the above-mentioned disadvantages and meets the recognized need for a passive filter cell, and methods of use thereof, that generally includes a basin with a floor and two or more vertical or upright sidewalls forming a chute or container having a first or left sidewall, a second or right sidewall, and a third or back sidewall, and a fourth or front, which may include a section of horizontal plane, downwardly curved or slanted sidewall, a wide yet shallow inlet positioned proximate a top of the fourth or front sidewall and an outlet positioned proximate the top of the third or back sidewall, wherein the floor is configured to be angled from the fourth or front sidewall to the third or back sidewall, a discharge pipe may be positioned proximate a junction may be between the floor and the third or back sidewall, and a flap may be configured to extend from the top of the third or back sidewall into an interior of the basin and, thus, functions to provide calm flow of liquid with suspended solids without turbulence, little to no restriction of flow of liquid carrying suspended solids, a low energy requirement, and/or a small acreage requirement to improve the performance of removal of suspended solids from effluent.

According to its major aspects and broadly stated, the present disclosure in its exemplary form is a passive gravity filter and methods of use having a basin with a floor and three vertical or upright sidewalls forming a chute or container having a first or left sidewall, a second or right sidewall, and a third or back sidewall, and a fourth or front downwardly curved or slanted sidewall, a wide yet shallow inlet positioned proximate a top of the fourth or front sidewall and an outlet positioned proximate the top of the third or back sidewall, wherein the floor is configured to be angled from the fourth or front sidewall to the third or back sidewall and angled from the first or left sidewall to the second or right sidewall, a valve discharge pipe may be positioned proximate a junction between the floor, the second or right sidewall, and the third or back sidewall, a flap or lip may be configured to extend from the top of the third or back sidewall into an interior of the basin, and thus functions to provide calm flow of liquid with suspended solids without turbulence, little to no restriction of flow of liquid carrying suspended solids, a low energy requirement, and/or a small acreage requirement to improve the performance of removal of suspended solids from effluent.

According to its major aspects and broadly stated, the present disclosure in its exemplary form is a passive gravity filter and methods of use that targets the true concept of "filtration", to separate water or other liquid medium from whatever non desirable substances they may contain either as a suspended substance or dissolved substance. It is noted herein that water, with a specific gravity of "1", is virtually absolute as to its weight. Everything else, such as suspended substance or dissolved substance is either heavier or lighter than water. For example, if you add dissolved minerals to water the mineral water is heavier. Moreover, other liquid mediums other than water enjoy a similar virtue.

In an exemplary embodiment, the passive gravity filter and methods of use thereof may include a passive filter cell for filtering an effluent with suspended substances and dissolved substances, the passive filter cell comprising a basin with a floor and two or more upright sidewalls forming a channel having a first sidewall, a second sidewall, back sidewall, and a front sidewall, the floor is configured on an angle from the front sidewall to the back sidewall, an inlet may be positioned proximate a top of the front sidewall to receive the effluent and an outlet may be positioned proximate the top of the back sidewall to exit the effluent, wherein the front sidewall is downwardly curved from the inlet to the floor, and a discharge pipe may be positioned proximate a junction between the floor and the back sidewall, a lip may be configured to extend from the top of the back sidewall into an interior of the basin, a charged particle precipitation apparatus.

In still a further exemplary embodiment of the passive gravity filter and methods of use thereof, a method of filtering an effluent with suspended substances and dissolved substances may be provided for operating the passive gravity filter. The method comprising the steps of providing two or more passive filter cells, each passive filter cell having a basin with a floor and two or more upright sidewalls forming a channel having a first sidewall, a second sidewall, back sidewall, and a front sidewall, the floor is configured on an angle from the front sidewall to the back sidewall, an inlet may be positioned proximate a top of the front sidewall to receive the effluent and an outlet positioned proximate the top of the back sidewall to exit the effluent, wherein the front sidewall is downwardly curved from the inlet to the floor, and a discharge pipe positioned proximate a junction between the floor and the back sidewall, joining at least a first passive filter cell and at least a second passive filter cell, wherein the outlet of the first passive filter cell is joined thereto the inlet of the second passive filter cell, inputting an effluent therein the inlet of the at least a first passive filter cell, filtering the effluent into a first effluent and a second effluent in each of the each passive filter cell, discharging the first effluent from the outlet of at least the first passive filter cell to the input of at least the second passive filter cell, and discharging the second effluent from the outlet of at least the second passive filter cell.

A feature of the passive gravity filter and methods of use thereof is the ability to provide individual modules or cells depending on the flow rate, suspended solid, clarity desired and other factors. Each module or cell is adjustable in virtually all parameters. Individual modules or cells can be added or subtracted in line, and once in place, tailored to deal with the load presented at that point in the system. These adjustments can be made after the system is in operation to optimize performance.

Another feature of the passive gravity filter and methods of use thereof is the ability to provide a system which is portable requiring no permanent infrastructure.

Still another feature of the passive gravity filter and methods of use thereof is the ability to provide a passive gravity filter modules or cells enhanced or equipped with charged particle precipitators. These modules or cells will, with charged particle precipitators, enable the clarifier to remove elements that are dissolved into the water not just suspended. Moreover, these modules or cells, with charged particle precipitators, may be used to create a device or array where the primary goal is to remove minerals and other elements that are dissolved in water or other liquid such as calcium, sodium, iron and the like.

Yet another feature of the passive gravity filter and methods of use thereof is the ability to provide a passive gravity filter modules or cells enhanced or equipped with a height adjustable anode or cathode of the charged particle precipitators to enable adjustment of removal of the dissolved particles and simplify cleaning of the plates.

Yet another feature of the passive gravity filter and methods of use thereof is the ability to provide large scale sustainable desalinization of salt or brackish water in support of agriculture and industry. The overriding issue that has impeded desalinization on a large scale has always been energy signature. Current methods, based on evaporative devices, osmosis, or other forms of micro filtration, simply use too much energy to be cost effective, thus, raising the cost when scaled to meet the needs of any type of large scale operation.

Yet another feature of the passive gravity filter and methods of use thereof is its ability to provide a wide and narrow inlet matched for purpose of maintaining a calm, congruent, non-turbulent inflow of effluent with suspended or dissolved substance.

Yet another feature of the passive gravity filter and methods of use thereof is its ability to provide a wide and narrow outlet for purpose of maintaining a calm, congruent, non-turbulent discharge of effluent with suspended or dissolved substance to become an inlet to the next coupled passive gravity filter module or cell.

Yet another feature of the passive gravity filter and methods of use thereof is its ability to provide a non-baffled and turbulent free suspended or dissolved solids clarifier. The slanted front sidewall enables the effluent flow to fall enabling heavier particles to fall at different rates and induce separation without impeding flow.

Yet another feature of the passive gravity filter and methods of use thereof is its ability to provide a filter with no moving parts or filters to change.

Yet another feature of the passive gravity filter and methods of use thereof is its ability to provide a filter having an inlet, an effluent speed reduction zone, a heavy particle separation zone, a storage zone, a discharge or harvest zone, and an outlet.

Yet another feature of the passive gravity filter and methods of use thereof is the ability to provide an angled, slanted, curved front sidewall or front floor to create a speed differential between differently weighted components of water, suspended solids, and dissolved solids or substances to separate or cause to fall out the water, suspended solids, and dissolved solids.

Yet another feature of the passive gravity filter and methods of use thereof is its ability to provide passive gravity filter modules or cells where each module or cell removes a small concentration, portion, or percentage of suspended substance and/or dissolved substance and multiple passive gravity filter modules or cells linked in series to clarify in stages in repeatable tuneable modules or cells and removes a large percentage of suspended substance and/or dissolved substance.

Yet another feature of the passive gravity filter and methods of use thereof is its ability to provide a standalone unit or module or cell, however the filter may be designed to be used in conjunction with other like units, providing a cellular or modular arrangement of modules or cells. This allows for the "cells" to be individually tailored to the requirements of each section of the separation or filtration process wherein each module or cell complete a portion of the overall filtration task. It should be mentioned that most waste water treatment systems are very difficult to modify after they are constructed. This leads to installations being purposely overbuilt to allow for future capacity needs. With a modular design, the design is constructed to meet the present capacity. Should more capacity be needed, a plurality of modules or cells may be added to achieve virtually any scale required. Therefore, a modular design cost savings may begin in the very earliest stages of planning and design.

Yet another feature of the passive gravity filter and methods of use thereof is its ability to provide passive gravity filter modules or cells, wherein individual modules or cells or groups of modules or cells may be transported.

Yet another feature of the passive gravity filter and methods of use thereof is its ability to provide passive gravity filter modules or cells where each module or cell discharges an effluent via the discharge pipe having small or low concentration, portion, or percentage of elevated suspended substance and/or dissolved substance verses traditional evaporative devices, osmosis, or other forms of micro filtration which discharge effluent with high or elevated concentration, portion, or percentage of suspended substance and/or dissolved substance, such as brine.

Yet another feature of the passive gravity filter and methods of use thereof is its ability to provide a reduced energy signature of the clarifier due to a single requirement to lift the effluent once rather than multiple times.

Yet another feature of the passive gravity filter and methods of use thereof is its ability to provide reduced energy signature of the clarifier due to no requirement to pressurize the effluent.

Yet another feature of the passive gravity filter and methods of use thereof is its ability to provide a reduced energy signature, or an energy efficient filter or clarifier, due to no requirement to increase the temperature of the effluent nor vaporize the effluent.

Yet another feature of the passive gravity filter and methods of use thereof is its ability to provide simple to build, simple to operate, gravity operated, and no need for polymer thickeners.

Yet another feature of the passive gravity filter and methods of use thereof is its ability to provide baffle free design whereas virtually all current designs require baffling and turbulence to facilitate the separation of foreign matter from the liquid medium. These prior art baffle designed seperators therefore are inherently energy intensive. Turbulence causes resistance and resistance must be overcome. Usually by energy intensive pumping.

Yet another feature of the passive gravity filter and methods of use thereof is its ability to provide desalination of sea water via addition of Charged Particle Precipitators Cells to create a device or array where the primary goal is to remove minerals and other elements that are dissolved in water such as calcium, sodium, iron, mercury, lead and other like particles or toxins that will receive and hold a charge. The primary goal of this type of device would be large scale sustainable desalinization in support of agriculture and industry.

These and other features of the passive gravity filter and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present passive gravity filter and methods of use thereof will be better understood by reading the Detailed Description of the Preferred and Selected Alternate Embodiments with reference to the accompanying drawing Figures, in which like reference numerals denote similar structure and refer to like elements throughout, and in which.

DETAILED DESCRIPTION

In describing the exemplary embodiments of the present disclosure, as illustrated in FIGS. 1-8, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to the FIGS. 1-7, there is illustrated a passive gravity filter and process for removing suspended substance and/or dissolved substance from an effluent, such as fresh, salt or brackish water, wastewater, sewage and/or industrial waste. It is important to understand that the apparatus and method for passive gravity filtration is suitable for utilization in any liquid environment where a decrease or removal of suspended substance and/or dissolved substance is desired or beneficial; therefore, while the apparatus and method for passive gravity filtration is described conveniently with the example utilization to treat sewage, wastewater pond, salt/brackish water, lagoon, lake, river, or the like it is not limited to application or implementation in such watersheds. Furthermore, the apparatus and method for passive gravity filtration may be utilized to treat water or other liquids such as but not limited to a golf course pond, water with aquatic plants, as well as water with fish and/or other marine life, fresh, salt or brackish water, wastewater, sewage, agriculture water, irrigation water, industrial waste and other liquid forms or effluents. The apparatus and method for passive gravity filtration is suitable for many applications where suspended substance and/or dissolved substance are to be removed or reduced from a liquid or liquid medium effluent E, including inorganic and/or organic waste, toxins, minerals, contaminants, pesticides, fertilizers, hormones, pharmaceuticals, hazardous chemicals or the like.

Figure 1:
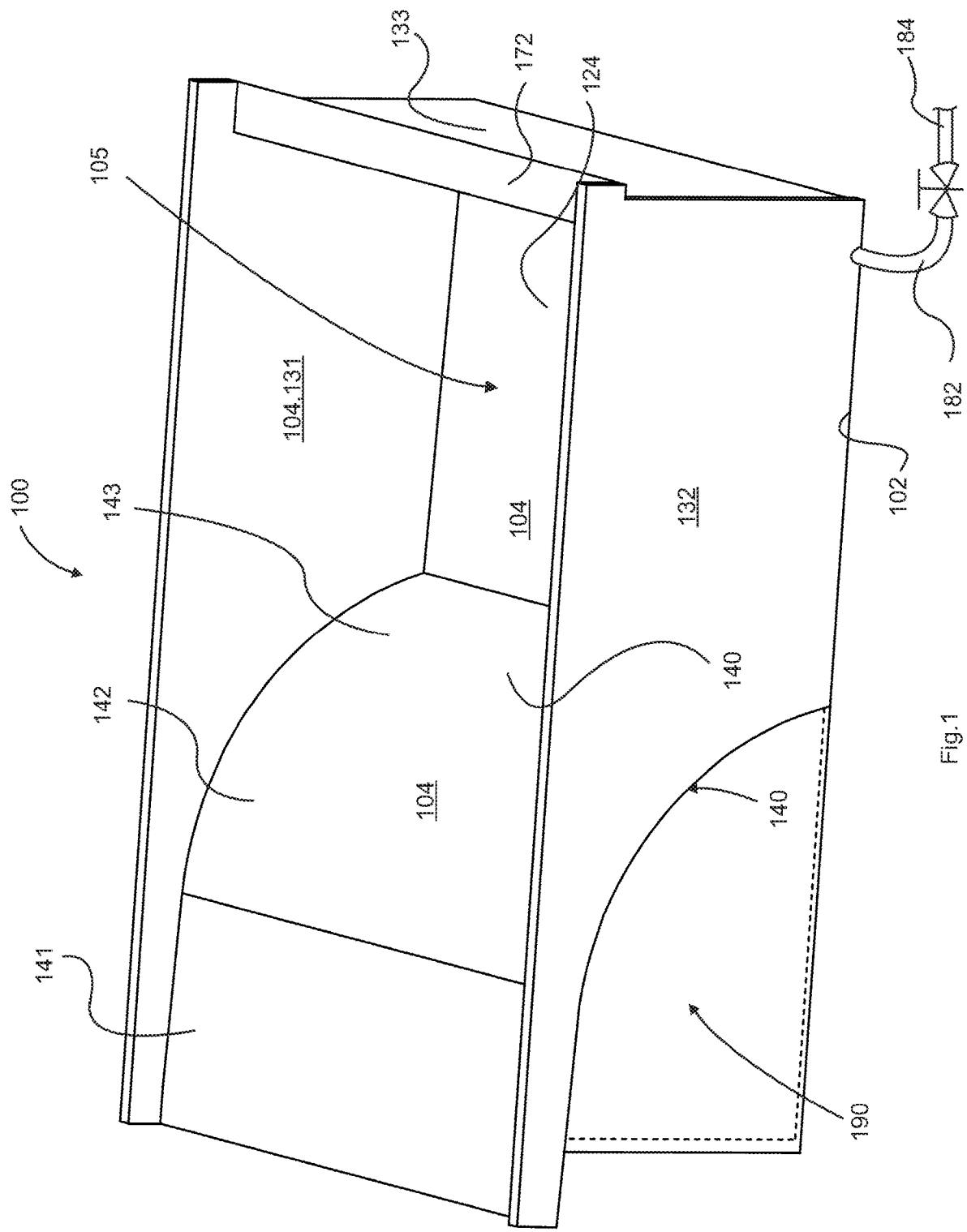
FIG. 1 is a perspective view of an exemplary embodiment of the passive gravity filter.
Figure 2:
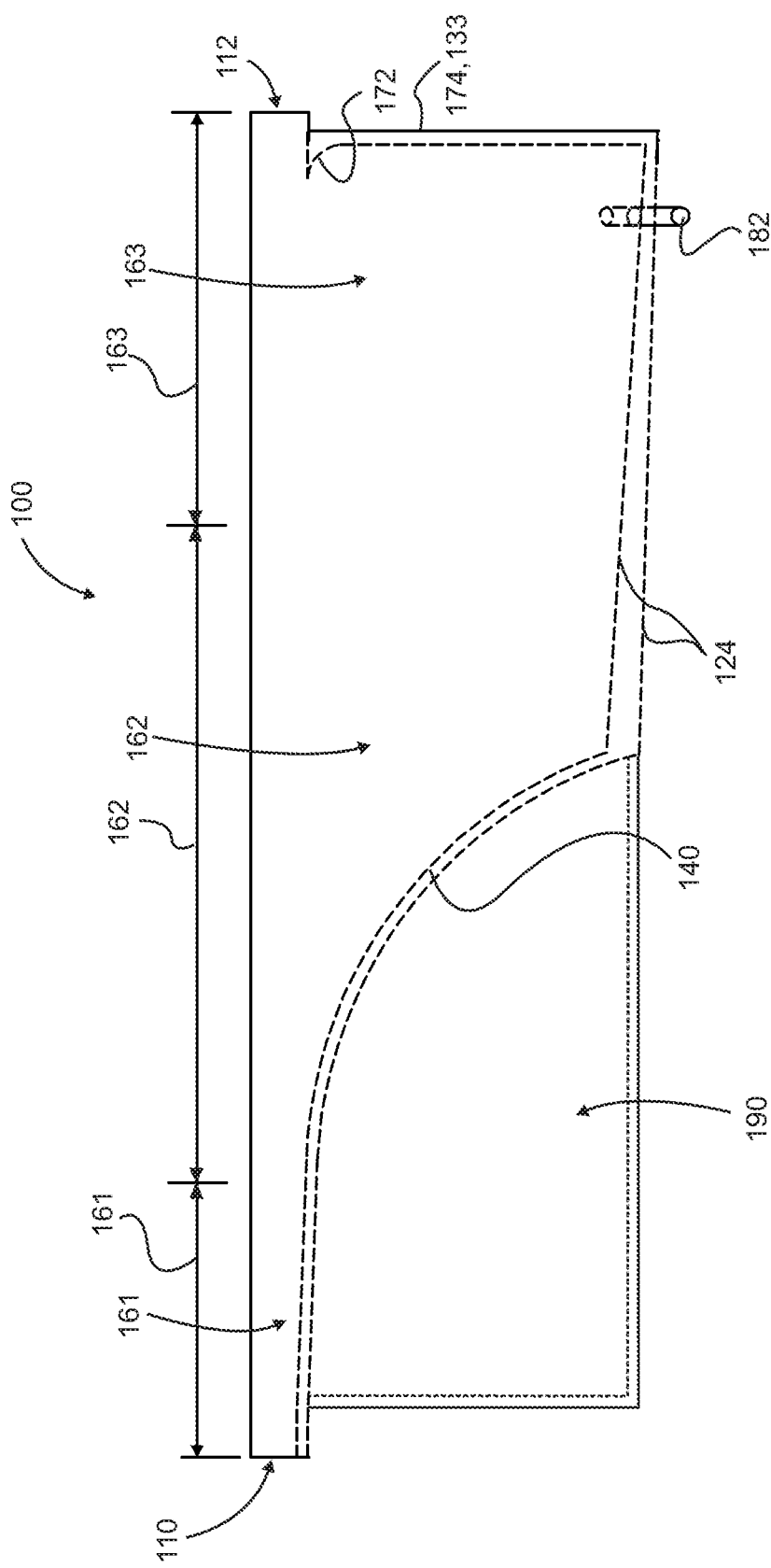
FIG. 2 is a side view of an exemplary embodiment of the passive gravity filter, according to FIG. 1.
Figure 3:
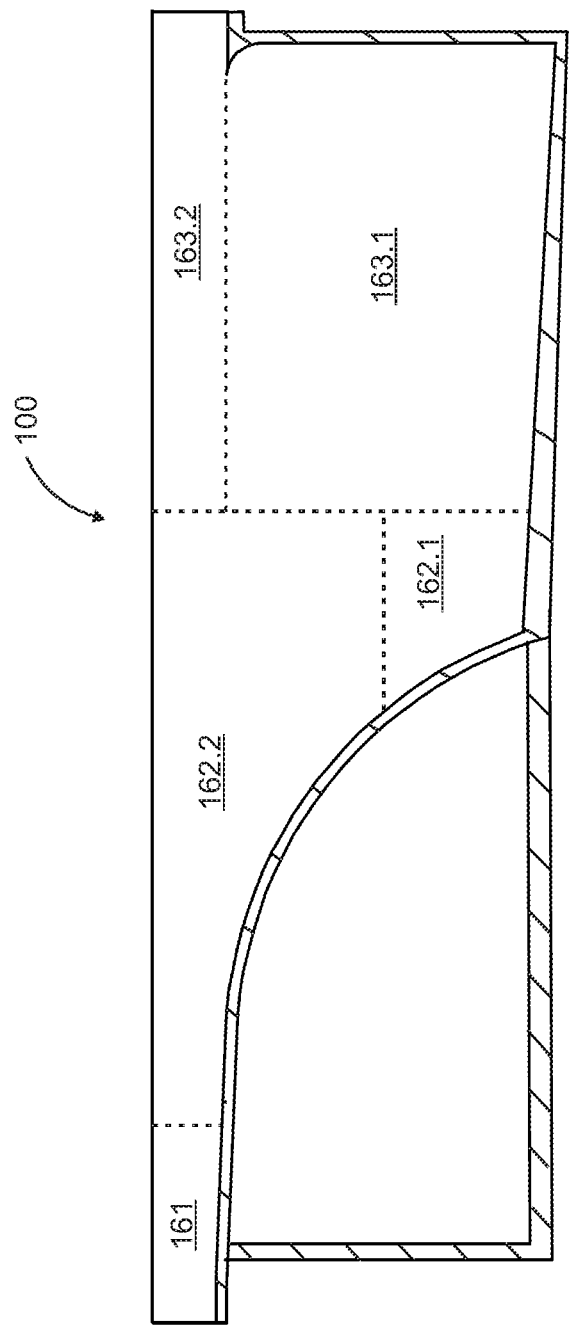
FIG. 3 is a side view of an exemplary embodiment of the passive gravity filter with identified flow zones, according to FIG. 1.

Referring now to FIGS. 1, 2, and 3, by way of example, and not limitation, there is illustrated an example embodiment filtration device, such as passive gravity filtration apparatus 100. Passive gravity filtration apparatus 100 preferably is configured as a basin or chute, such as structure 102 in the shape of a rectangle or trough, such as channel 105 wherein effluent E flows therethrough or thereon interior surface 104 of passive gravity filtration apparatus 100. Passive gravity filtration apparatus 100 may be formed of any watertight and/or corrosion resistant material, capable of directing the inflow and outflow of liquid through a designated pathway. Moreover, passive gravity filtration apparatus 100 may preferably be constructed of fiberglass, plastic, as these materials offers a variety of forms and shapes; however, other suitable materials such as Styrofoam, metal, aluminum, concrete, composite, and may be lined with rubber or silicone or the like, formed of multiple layers with different materials, or the like, may be utilized, provided such material has sufficient strength and/or durability as would meet the purpose described herein.

It is contemplated herein that structure 102 may be configured in other shapes other than a trough, such as rectangle, tube, or channel 105.

Passive gravity filtration apparatus 100 may have an outer dimension of width by height by length of approximately three (3) feet by three (3) by nine (9) feet; however smaller and larger dimensions are contemplated herein to accommodate different applications, effluent E flows, and/or suspended substance SS and/or dissolved substance DS being removed or reduced from a liquid or liquid medium, such as effluent E. Moreover, the size of passive gravity filtration apparatus 100 is limited only by application. Stationary units may be very large and mobile units may be smaller. However, the design may allow for efficiencies intrinsic in smaller portable units, optimally sized to a specific applications.

Moreover, structure 102 in the shape of a channel or trough wherein effluent E flows therethrough or thereon interior surface 104. Passive gravity filtration apparatus 100 may include one or more walls, such as front sidewall 140, floor 124, left or first sidewall 131, right or second sidewall 132, and back sidewall 133 configured as trough or channel 105 wherein effluent E flows therethrough or thereon interior surface 104 of structure 102. Preferably, front sidewall 140 may be adjoined along different common borders thereto left or first sidewall 131, right or second sidewall 132, and floor 124. Likewise, back sidewall 133 may be adjoined along different common borders thereto left or first sidewall 131, right or second sidewall 132, and floor 124. Preferably, left or first sidewall 131, right or second sidewall 132 are opposing or opposite one another as are front sidewall 140 and back sidewall 133 are opposing or opposite one another. Moreover, left or first sidewall 131, right or second sidewall 132, and back sidewall 133 are preferably configured to be vertical or upright to form channel 105 wherein effluent E flows therethrough or thereon interior surface 104.

Passive gravity filtration apparatus 100 may preferably include inlet 110 preferably configured to receive or input effluent E as incoming flow thereto passive gravity filtration apparatus 100. Inlet 110 preferably organizes or configures flow of effluent E into a broad flat relatively slow moving column of liquid, and thus, presents effluent E as a narrow height, approximately one to eight (1-8) inches, and wide width, approximately 24 to 36 (24-36) inches, however other dimensions of broad width and flat height horizontal cross section flow of effluent E entering passive gravity filtration apparatus 100 are included herein. It is contemplated herein that inlet 110 enables flow of effluent E to slow down, spread out and remove any turbulence, eddy currents, and align flow parallel to inlet 110. Moreover, inlet 110 may be positioned proximate top section 122 of structure 102 and formed therefrom portions of front sidewall 140, left or first sidewall 131, and right or second sidewall 132.

Passive gravity filtration apparatus 100 may include outlet 112 preferably configured to discharge effluent E as outgoing flow therefrom passive gravity filtration apparatus 100. Outlet 112 preferably organizes or configures flow of effluent E into a broad flat relatively slow moving column of liquid, and thus, presents effluent E as a shallow, shorten or decrease, in height, approximately one to eight (~1-8) inches, and wide width, approximately 24 to 36 (24-36) inches, however other dimensions of wide width or broad width and flat height horizontal cross section flow of effluent E exiting passive gravity filtration apparatus 100 are included herein. It is contemplated herein that outlet 112 enables flow of effluent E to slow down, spread out and remove any turbulence, eddy currents, and align flow parallel to outlet 112. Moreover, outlet 112 may be positioned proximate top section 122 of structure 102 and formed therefrom portions of back sidewall 133, left or first sidewall 131, and right or second sidewall 132.

It is contemplated herein that the cross section of inlet 110 and outlet 112 may be approximately one and a half square feet 1½ sq-ft, however, other cross sectional dimensions are contemplated herein to accommodate effluent E flows, and/or suspended substance SS and/or dissolved substance DS being removed or reduced from a liquid or liquid medium, such as effluent E and maintain broad, flat aspect ratio of inlet 110 and outlet 112.

It is further contemplated herein that the flow rate of effluent E therethrough inlet 110 and outlet 112 may be approximately one and a half feet per second (1½ feet/second) to three feet per second (3 feet/second) or one half to one meter per second (0.5-1 meter/second), however, other flow rates are contemplated herein to accommodate effluent E flows in a non-turbulent or minimum turbulence manner, and/or suspended substance SS and/or dissolved substance DS being removed or reduced from a liquid or liquid medium, such as effluent E.

It is further contemplated herein that the maximum flow rate of effluent E therethrough inlet 110 and outlet 112 may be approximately one and a half million gallons a day 1½ Mgal/day, however, other maximum flow rates are contemplated herein to accommodate effluent E flows, and/or suspended substance SS and/or dissolved substance DS being removed or reduced from a liquid or liquid medium, such as effluent E.

Preferably, front sidewall 140 may be configured as angled, slanted, curved, or the like, and may be preferably curved and descending or downward from inlet 110 to floor 124 or common borders between floor 124, left or first sidewall 131, and right or second sidewall 132. Moreover, front sidewall 140 may include first or flat or horizontal section 141, second or curved section 142, and third or vertical section 143.

Moreover, back sidewall 133 may include lip 172 positioned at a first end, such as upper end 174 of third or vertical section 143. Preferably, lip 172 projects or extends therein to an interior of channel 105 opposite the direction of flow of effluent E to shear off and hold therein heavier effluent E.

Furthermore, floor 124 may be configured as angled, slanted, sloped, curved, diagonal, or the like from one sidewall to the next, including but not limited to, angled down or slanted from left or first sidewall 131 to right or second sidewall 132 and/or angled down or slanted from front sidewall 140 to back sidewall 133. Floor 124 may be configured as angled, slanted, curved, diagonal, or the like for the purpose of settling and moving collected or separated particulate, such as suspended substance SS and/or dissolved substance DS being removed or reduced from a liquid or liquid medium, such as effluent E toward discharge pipe 182. Discharge pipe 182 is preferably positioned proximate floor 124 and back sidewall 133 and may pass therethrough right or second sidewall 132 and may alternatively be positioned therein left or first sidewall 131. It is recognized herein that floor 124 and discharge pipe 182 may be alternatively designed to accommodate discharge pipe 182 therein left or first sidewall 131, right or second sidewall 132, back sidewall 133, floor 124, or the like to discharge effluent E.

Moreover, heavy effluent E discharged via discharge pipe 182 may be regulated either manually or automatically via a valve 184. Moreover, the purpose of discharge pipe 182 may be preferably to maintain a steady or intermittent draw down of heavy effluent E and return the sludge or heavier water or heavy effluent E back to the waterway, resident lagoon or to a dewatering section to harvest the materials, such as suspended substance SS and/or dissolved substance DS.

Still furthermore, passive gravity filtration apparatus 100 may include dry area 190 formed therein and configured under front sidewall 140. Dry area 190 may be utilized for storage.

Figure 4:
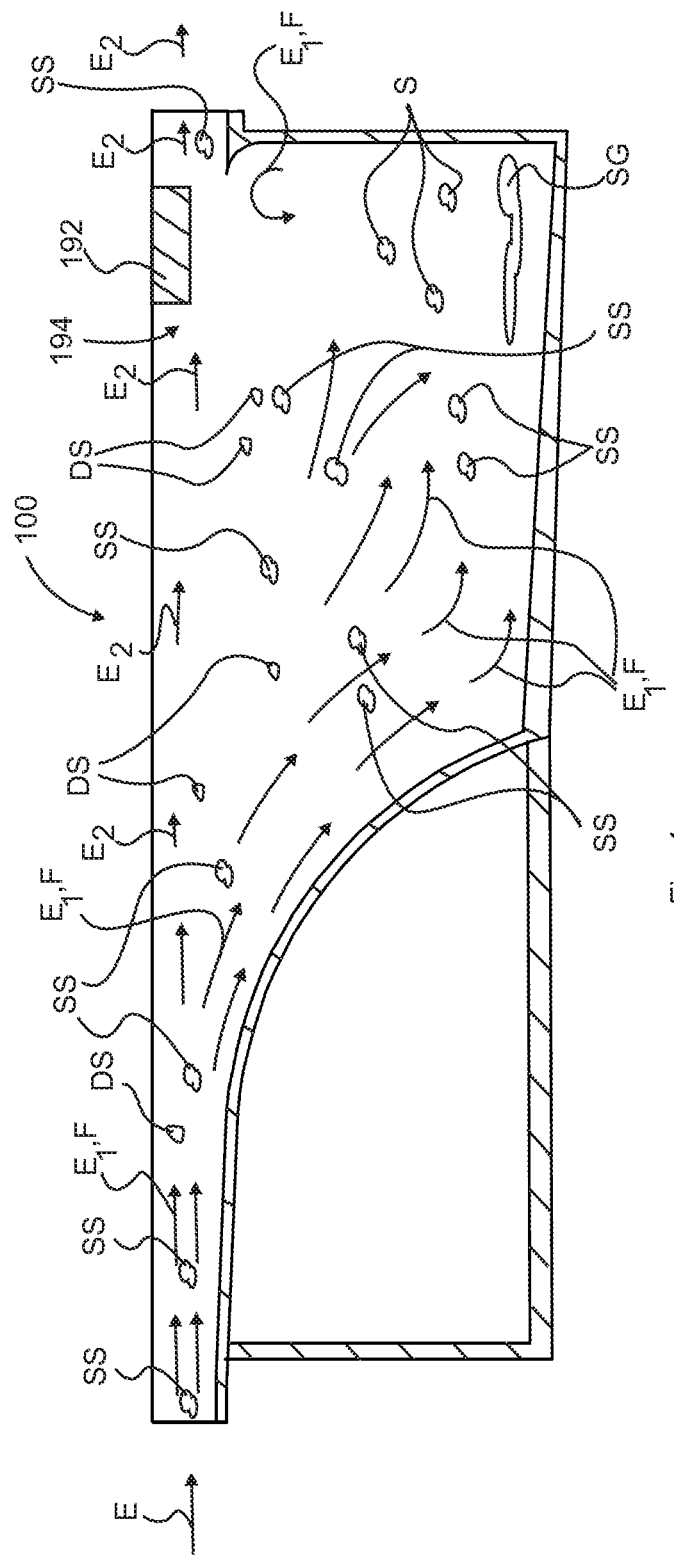
FIG. 4 is a side view of an exemplary embodiment of the passive gravity filter with identified flow arrows of an effluent, according to FIG. 1.

Referring now to FIG. 4, by way of example, and not limitation, there is illustrated an example embodiment of passive gravity filtration apparatus 100 with arrows of flow F showing effluent E path therethrough structure 102 or thereon interior surface 104 of passive gravity filtration apparatus 100. Preferably, effluent E enters inlet 110 and traverses first or flat or horizontal section 141 of interior surface 104, the entry area, such as receiving zone 161. Receiving zone 161 is preferably configured as a narrow or flat in height and wide, widen, or broad in width cross section of flow F of effluent E. Possibly preferably, receiving zone 161 utilizes approximately the first one third of the total linear length of front sidewall 140. Moreover, receiving zone 161 may preferably enable flow F of effluent E to organize directionally, becoming a stable "column" of liquid. It is contemplated herein that flow F of effluent E, in receiving zone 161, may spread out into a broad flat relatively slow moving column of liquid, and thus, presents effluent E as a narrow or flat in height and wide or broad in width cross section flow F of effluent E traversing first or flat or horizontal section 141 of interior surface 104 without any turbulence or with reduced turbulence, eddy currents, and flow F of effluent E. Effluent E, in receiving zone 161, aligns flow F in parallel to inlet 110 and receiving zone 161. Effluent E, containing undesirable impurities, is now traveling at a steady state speed with a minimum of turbulence in receiving zone 161.

Next, effluent E preferably enters separation zone 162 and traverses second curved section 142, which may be formed as angled, slanted, rounded, arching, diagonal, or the like, of interior surface 104. Separation zone 162 is preferably configured as a section where the bottom of structure 102 and interior surface 104 of passive gravity filtration apparatus 100 drops, declines, falls away (increased angle) in a curved decent or downwardly curved. The effect of curved section 142 on flow F of effluent E preferably is to capture or separate a body or section of first effluent E1 (first effluent E1 includes a higher concentration of suspended substance SS and/or dissolved substance DS effluent (heavier particulate, particle or substance)) therein first separation zone 162.1, that is moving slower than second effluent E2 (second effluent E2 includes a lower concentration of suspended substance SS and/or dissolved substance DS effluent (lighter particulate, particle or substance)) therein second separation zone 162.2, the column or section of second effluent E2 now traveling across the "top" of separation zone 162 (second separation zone 162.2), thus creating an area of "shear" or "separation"—where the slower heavier first effluent E1 therein first separation zone 162.1 separates from the relatively faster lighter moving effluent in second effluent E2 therein second separation zone 162.2. Moreover, second or curved section 142 of interior surface 104 accomplishes this shear, separation, or delta in speed between first effluent E1 and second effluent E2 with the minimum of turbulence by increasing the volume of first effluent E1 therein first separation zone 162.1 gradually by increasing the angle of second or curved section 142 and then dropping away quickly of the angle of third or vertical section 143 of interior surface 104. First separation zone 162.1 enables heavier matter, first effluent E1, such as suspended substance SS and/or dissolved substance DS already being pulled downward by gravity in receiving zone 161 to be caught in the slower moving first effluent E1 traversing in first separation zone 162.1 the shear zone, wherein first effluent E1 dramatically loses velocity. As the matter lost velocity, first effluent E1 traversing in first separation zone 162.1 is unable to rejoin second effluent E2 therein second separation zone 162.2 as it moves on to outlet 112 and exits passive gravity filtration apparatus 100. This effect can literally be seen as a siphon, pulling first effluent E1 now separated from second effluent E2 farther down into first separation zone 162.1 as third or vertical section 143 drops away quickly due to the steep angle of third or vertical section 143. Only the lightest second effluent E2 remains in second separation zone 162.2 as it moves through separation zone 162.

It is contemplated herein that, as the bottom begins to fall away (angle of second or curved section 142 to and third or vertical section 143), heavier particles or substance of first effluent E1 begin to fall towards slower moving first effluent E1 in first separation zone 162.1. Herein, higher concentration, portion, and/or percentage of suspended substance SS and/or dissolved substance DS of effluent E1 therein first separation zone 162.1 velocity of flow F1 slows and suspended substance SS and/or dissolved substance DS begin to settle out of effluent E as effluent E1 into first separation zone 162.1. Moreover, lower concentration, portion, and/or percentage of suspended substance SS and/or dissolved substance DS of effluent E2 therein second separation zone 162.2 velocity of flow F increases relative to effluent E1 and effluent E2 moves through separation zone 162 to collection zone 163 and then outlet 112.

Next, first effluent E1 preferably enters settling zone or area, such as collection zone 163 wherein floor 124 of interior surface 104 being configured as angled, slanted, curved, diagonal, or the like from one sidewall to the next towards discharge pipe 182, and thus floor 124 collects and moves heaviest first effluent E1 (sludge SG) to discharge pipe 182 wherein discharge pipe 182 removes first effluent E1 (sludge) therefrom collection zone 163. Preferably collection zone 163 and angled floor 124 are in combination configured to maintain a steady draw down of heavy first effluent E1 (sludge SG). This sloping effect directs the more concentrated and heavier first effluent E1 towards the evacuation port, discharge pipe 182. This is an important feature as passive gravity filtration apparatus 100 must continually remove or "evacuate" enough of first effluent E1 to keep passive gravity filtration apparatus 100 from filling up with first effluent E1 (sludge SG).

Next, as lightest second effluent E2 traverses from inlet 110 to outlet 112 across receiving zone 161, separation zone 162, and collection zone 163, lightest second effluent E2 encounters lip 172. Preferably, lip 172 located proximate a first end, such as upper end 174 of third or vertical section 143. Preferably, lip 172 projects or extends therein an interior, such as channel 105 opposite the direction of flow F of effluent E to shear off and hold therein heavier effluent, first effluent E1 in collection zone 163. Moreover, the purpose of lip 172 may be to preferably complete the separation or shearing effect and capture as much of the remaining heavier contaminates, first effluent E1 that may still be tumbling in the "shear zone" and hold remaining heavier contaminates, first effluent E1 therein first collection zone 163.1. It is contemplated herein that lip 172 can be adjusted in reach (extends therein channel 105) and height (along first end, such as upper end 174 of third or vertical section 143) as necessary to effect as efficient a capture ratio as possible from first collection zone 163.1. Herein, higher concentrations, portions, and/or percentage of suspended substance SS and/or dissolved substance DS therein first collection zone 163.1 where the velocity of flow F1 slows and/or dissolved substance begin to settle out of effluent E as first effluent E1 into sludge SG therein first collection zone 163.1.

Next, first effluent E1 preferably enters settling area, such as second collection zone 163.1 and due to floor 124 of interior surface 104 being configured as angled, slanted, curved, diagonal, or the like from one sidewall to the next towards discharge pipe 182. Discharge valve 184 of discharge pipe 182 may be opened to remove heaviest first effluent E1 (sludge) therefrom first collection zone 163.1. Preferably first collection zone 163.1 and angled floor 124, in combination, may be configured to maintain a steady draw down of heavy, first effluent E1 from first collection zone 163.1. This sloping effect directs the more concentrated and heavier first effluent E1 towards the evacuation port, discharge pipe 182. This is an important feature as passive gravity filtration apparatus 100 must continually remove or "evacuate" enough of first effluent E1 to keep passive gravity filtration apparatus 100 from filling up with first effluent E1 (sludge).

Next, only the lightest second effluent E2 remains in second collection zone 163.2 and traverses through collection zone 163 to outlet 112.

Some substances are lighter than water having a lower specific gravity than water, such as oil and grease OG, and float proximate one or more skimmers 192 positioned proximate top section 122 of structure 102 or on top surface 194 of effluent E. Other substances that are heavier than water having a specific gravity greater than water may be suspended in water by turbulence, eddy currents of flow F of effluent E travelling parallel to interior surface 104, specifically in receiving zone 161 of interior surface 104. Herein, flow F of effluent E virtually stops in first collection zone 163.1 and second collection zone 163.2 enabling suspended substance SS and/or dissolved substance DS to settle out of effluent E as heavier first effluent E1 discharged from passive gravity filtration apparatus 100 via discharge pipe 182 and lighter second effluent E2, and thus, removes a small concentration, portion, or percentage of heavier first effluent E1, which in turn lowers the concentration, portion, or percentage of suspended substance SS and/or dissolved substance DS therein effluent E exiting passive gravity filtration apparatus 100.

Furthermore, passive gravity filtration apparatus 100 may include one or more skimmers 192 positioned proximate top section 122 of structure 102 (approximately three quarters of the way down the long axis of passive gravity filtration apparatus 100) as an absorbent material floating on top surface 194 of effluent E. Preferably, skimmer 192 skims floating contaminants or substances, such as oil and grease OG floating thereon top surface 194 of effluent E and removes such floating contaminants from effluent E and/or second effluent E2. Moreover, skimmer 192 is preferably utilized when effluent E is sourced from, for example, restaurants, automotive shops, or industry and used to remove fats, oils, grease and other matter that is actually lighter than water and floats to top surface 194 of effluent E. Moreover, skimmer 192 may be used where needed and tailored to specific floating contaminates such as oil, grease, pesticides, herbicides, volatile organic compounds (VOCs) or other floating substances. It is contemplated herein that passive gravity filtration apparatus 100 with a specific type of skimmer 192 may be located therein where contaminant is most easily captured. Some VOCs may not surface until the water has been through several cycles through passive gravity filtration apparatus 100.

Figure 5:
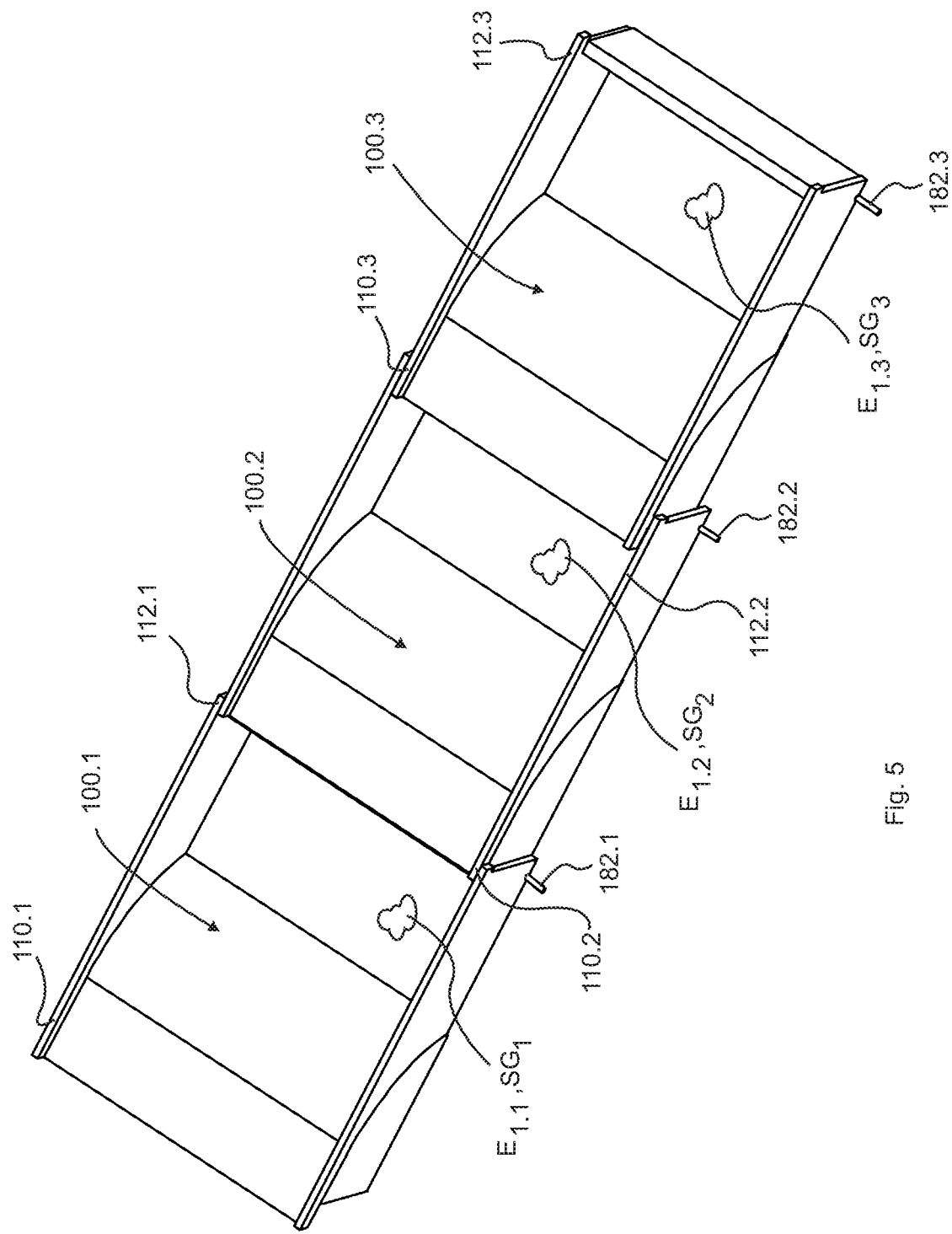
FIG. 5 is a perspective top view of an exemplary embodiment of a plurality of in series passive gravity filters, according to FIG. 1.

Referring now to FIG. 5, by way of example, and not limitation, there is illustrated an example embodiment of two or more inline passive gravity filtration apparatus 100.n. Two or more inline passive gravity filtration apparatus 100.n may be linked or connected via joining flange 710/710.1 utilized to couple first outlet 112.1 of first passive gravity filtration apparatus 100.1 thereto second inlet 110.2 of second passive gravity filtration apparatus 100.2.

It is contemplated herein that first passive gravity filtration apparatus 100.1 and second passive gravity filtration apparatus 100.2 and so on, for two or more passive gravity filtration apparatuses 100, may be configured as two or more passive filter cells.

It is contemplated herein that inlet 110 and outlet 112 may be configured to be similarly shaped or designed to inner lock or fit or joined one within the other or uniform mating allowing for a uniform mating of the cells of an array of two or more inline passive gravity filtration apparatus 100.n In operation, each passive gravity filtration apparatus 100.n is tasked with removing a small concentration, portion, or percentage of heavier first effluent E1.n in its stage, cell, or unit and collectively the series of two or more inline passive gravity filtration apparatus 100.n may achieve multiples of removal of small concentrations, portions, or percentages of heavier first effluent E1.n and thus, remove a large concentration, portion, or percentage of heavier first effluent E1, which in turn lowers the concentration, portion, or percentage of suspended substance SS and/or dissolved substance DS therein effluent E exiting the last in a series of two or more inline passive gravity filtration apparatus 100.*n*. Moreover, each module or cell of two or more inline passive gravity filtration apparatus 100.*n* is adjustable in virtually all parameters. Individual modules or cells of two or more inline passive gravity filtration apparatus 100.*n* can be added or subtracted in line, and once in place tailored to deal with the load presented at that point in the system. These adjustments can be made after the system is in operation to optimize performance.

Preferably discharge pipe 182.*n* is adjustable via discharge valve 184/184.*n*. This feature enables "tuning" of discharge first effluent E1.*n* through discharge pipe 182 for each cell of two or more inline passive gravity filtration apparatus 100.*n*. Moreover, the initial flow rate of effluent E coming into inlet 110 may be adjusted as well for "tuning". Early in the series, such early cells of two or more inline passive gravity filtration apparatus 100.*n* may discharge larger amounts of first effluent E1.*n* via discharge pipe 182.*n* because the cells located in the early section of an array of two or more inline passive gravity filtration apparatus 100.*n* will preferably be exposed to a higher concentration, portion, or percentage of contaminates, such as suspended substance SS and/or dissolved substance DS effluent E. Furthermore, the ideal adjustment, for each discharge pipe 182.*n*, is to remove only the volume of first effluent E1.*n* necessary to optimize the performance of each individual cell of two or more inline passive gravity filtration apparatus 100.*n*, keeping the apparatus clear of buildup and enhancing the "siphoning" effect of each second or curved section 142 and/or third or vertical section 143. It is recognized herein that cells early in the array of two or more inline passive gravity filtration apparatus 100.*n* may discharge as much as approximately ten percent (10%) of first effluent E1.1 whereas cells located close to the end of the array of two or more inline passive gravity filtration apparatus 100.*n* may discharge a fraction, approximately one percent (1%) of first effluent E1.1, as first effluent E1.*n*. These percentages of discharge reflect the overall volume of effluent E1 flowing through the array of two or more inline passive gravity filtration apparatus 100.*n*. Moreover, first effluent E1.*n*, being removed from the overall flow therethrough two or more inline passive gravity filtration apparatus 100.*n* and containing high concentrations of organic sludge SG.n, can be returned to a lagoon for biological digestion or sent to a thickener for disposal as per standard industry practices.

Furthermore, when effluent E2 finally arrives at the outlet 112, effluent E2 is preferably reformed in preparation of entry into the next cell in the array of two or more inline passive gravity filtration apparatus 100.*n*. Thus, the process of adding additional cells can be repeated as many times as necessary to achieve the desired results of water quality released from two or more inline passive gravity filtration apparatus 100.*n*.

It is contemplated herein that passive gravity filtration apparatus 100.*n* may be assembled in series end-to-end, may be stacked, assembled in rows, and the like, and in combinations thereof.

For example, salt, at the molecular level, salt dissolves in water due to electrical charges and due to the fact that both water and salt compounds are polar, with positive and negative charges on opposite sides in the molecule. The bonds in salt compounds are called ionic because they both have an electrical charge—the chloride ion is negatively charged and the sodium ion is positively charged. Likewise, a water molecule is ionic in nature, but the bond is called covalent, with two hydrogen atoms both situating themselves with their positive charge on one side of the oxygen atom, which has a negative charge. When salt is mixed with water, the salt dissolves because the covalent bonds of water are stronger than the ionic bonds in the salt molecules.

The positively-charged side of the water molecule are attracted to the negatively-charged chloride ions and the negatively-charged side of the water molecules are attracted to the positively-charged sodium ions. Essentially, a tug-of-war ensues with the water molecules winning the match. Water molecules pull the sodium and chloride ions apart, breaking the ionic bond that held them together. After the salt compounds are pulled apart, the sodium and chloride atoms are surrounded by water molecules. Once this happens, the salt is dissolved, resulting in a homogeneous solution.

Figure 6:
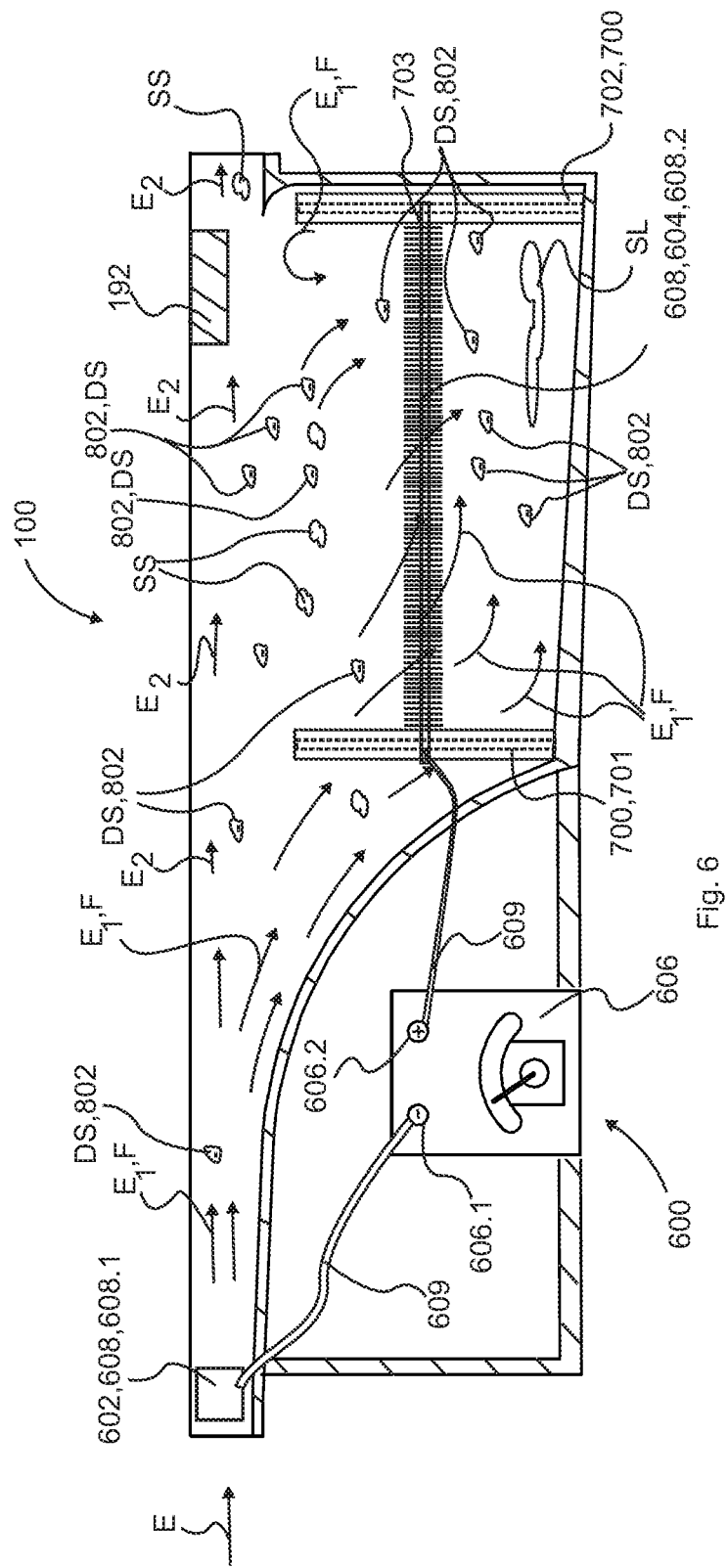
FIG. 6 is a side view of an exemplary embodiment of the passive gravity filter, according to FIG. 1, with integrated charged particle precipitation apparatus.

Referring now to FIG. 6, by way of example, and not limitation, there is illustrated an example embodiment of passive gravity filtration apparatus 100 with charged particle precipitation apparatus 600 integrated therein. Charged particle precipitation apparatus 600 may be a filtration device that removes, collects, and/or separates fine particles, suspended substance SS and/or dissolved substance DS therein effluent E using the force of an induced electrostatic charge. Electrostatic or electric charge is the physical property of matter that causes the object to experience a force when placed in an electromagnetic field. There are two types of electric charges: positive and negative. Like charges repel, and unlike charges attract. Charged particle precipitation apparatus 600 preferably functions to create a body or section of first effluent E1 (first effluent E1 includes a higher concentration, portion, or percentage of suspended substance SS and/or dissolved substance DS effluent (first negative charged effluent—negative charged particle or substance)) having a negative charge and attracted thereto first separation zone 162.1 in contrast to second effluent E2 (second effluent E2 includes a lower concentration, portion, or percentage of suspended substance SS and/or dissolved substance DS effluent (second non negative charged effluent—positive charged particle or substance)) having a neutral or positive charge and repelled or un attracted thereto first separation zone 162.1, and thus, remains in second separation zone 162.2. It is contemplated herein that polarity of charge may be reversed between first effluent E1 and second effluent E2. Moreover, passive gravity filtration apparatus 100 preferably utilizes the repulsion and attractive properties of positive and negative charge to separate suspended substance SS and/or dissolved substance DS therein effluent E.

Charged particle precipitation apparatus 600 may include inlet charging grid 602 (negative), separation charging grid 604 (positive), and electric power source 606. Inlet charging grid 602 may preferably be positioned proximate inlet 110, receiving zone 161, or anywhere upstream of separation charging grid 604. Moreover, inlet charging grid 602 may include conductive surface, such as one or more charge plates 608 spaced apart therein effluent E passing therethrough inlet 110, receiving zone 161. In one embodiment, inlet charging grid 602 may include one or more charge plates 608.1 configured with a plurality of 0.200 inch thick plates aligned vertically and spaced approximately two (2) inches apart. Furthermore, one or more charge plates 608.1 may be configured as square or rectangle or other shape and may be approximately two (2) inches wide and may extend in height up to the full height of inlet 110 to maximize negative charge of power supply contact with incoming effluent E. Furthermore, one or more charge plates 608.1 may be configured in one or more sets or rows of plates and may be angled relative to flow F of effluent E, for example, approximately 10 degrees off center to maximize surface contact therewith effluent E passing therethrough inlet 110 and receiving zone 161. Still furthermore, a subsequent row may be oppositely aligned relative to a previous row to realign flow F of effluent E and to minimize any turbulence of flow F of effluent E therein inlet 110 and receiving zone 161.

It is recognized herein that liquid medium (water) effluent E comprises molecules or subcomponents of liquid medium (water) and liquid medium (water) having suspended substance SS and/or dissolved substance DS. In use, inlet charging grid 602 preferably transfers a charge (negative) thereto molecules or subcomponents 802 of liquid medium (water) having suspended substance SS and/or dissolved substance DS therein effluent E passing therethrough inlet 110 and receiving zone 161 and transfers little or no charge (negative) thereto molecules or subcomponents molecules or subcomponents 802 of liquid medium (water) not carrying suspended substance SS and/or dissolved substance DS.

It is contemplated herein that one or more charge plates 608 may be arranged as parallel plates to allow for electrical contact thereto effluent E with a minimum of disturbance, however, other configurations, sizes, and dimensions are included herein to maintain broad, flat, calm, water column of effluent E to maximum separation efficiency. Turbulence causes particles to tend to stay mixed.

Power supply 606 may include standard fixed power supply or a power supply with adjustable/variable voltage, current, and/or polarity. Power supply 606 preferably includes positive output terminal 606.2 and a negative output terminal 606.1 wherein negative output terminal 606.1 may be electrically connected via electrical wire 609 thereto inlet charging grid 602 and positive output terminal 606.2 may be electrically connected via electrical wire 609 thereto separation charging grid 604.

Furthermore, separation charging grid 604 (positive), may include one or more charge plates 608 spaced apart therein effluent E passing therethrough separation zone 162 and collection zone 163. In one embodiment, separation charging grid 604 may include one or more charge plates 608.2 configured with a plurality of 0.125 inch thick plates aligned vertically and spaced approximately two (2) inches apart. Furthermore, one or more charge plates 608.2 may be configured as square or rectangle or other shape and may be approximately one and a half (1.5) inches wide and may extend in height to approximately two (2) inches to maximize positive charge of power supply.

It is recognized herein that charging grid 604 attracts and pulls of first effluent E1 (molecules or subcomponents 802 of liquid medium (water) having negatively charged (negative) suspended substance SS and/or dissolved substance DS) thereto separation zone 162 and/or collection zone 163. Moreover, charging grid 604 repels second effluent E2 (molecules or subcomponents molecules or subcomponents 802 of liquid medium (water) not carrying suspended substance SS and/or dissolved substance DS and having little or no charge (negative)), and, thus second effluent E2 traverses thereto second separation zone 162.2 and second collection zone 163.2.

Furthermore, one or more first charge plates 608 may be configured in one or more rows of plates and may be angled relative to first flow F1 of first effluent E1, for example, approximately 10 degrees off center to maximize contact therewith first effluent E1 moving into separation zone 162 and/or collection zone 163. Still furthermore, a subsequent row may be oppositely aligned relative to a previous row to realign first flow F1 of first effluent E1 and to minimize any turbulence of first flow F1 of first effluent E1 therein separation zone 162 and/or collection zone 163.

It is recognized herein that flow F1 of first effluent E1 is slower in separation zone 162 and/or collection zone 163, and thus the pattern of separation on charging grid 604 may be tighter than that on inlet charging grid 602.

It is recognized herein that liquid medium (water) effluent E comprises molecules or subcomponents of liquid medium (water) and liquid medium (water) having suspended substance SS and/or dissolved substance DS. In use, separation charging grid 604 preferably attracts or pulls (attraction to the opposite electric field created by separation charging grid 604) charged (negative) molecules or subcomponents 802 of liquid medium (water) having suspended substance SS and/or dissolved substance DS therein effluent E thereto or toward its one or more charge plates 608.2, and has little or no attraction or pull thereon charged molecules or subcomponents 802 of liquid medium (water) not carrying suspended substance SS and/or dissolved substance DS; thus separating at least a portion or percentage of first effluent E1 (charged) therefrom second effluent E2 (non-charged) in separation zone 162 and/or collection zone 163.

It is recognized herein that first effluent E1 carrying a negative charge [charged (negative) molecules or subcomponents 802 of liquid medium (water) having suspended substance SS and/or dissolved substance DS] begins to be pulled downward toward separation charging grid 604. Separation takes place in this area, separation zone 162. The vast majority of the liquid medium, second effluent E2, carrying no electrical charge begins separating from first effluent E1 and traverse to outlet 112.

It is recognized herein that separating at least a portion or percentage of first effluent E1 therefrom second effluent E2 enables discharge via discharge pipe 182 to comprise a higher concentration, portion, or percentage of suspended substance SS and/or dissolved substance DS therein relative to effluent E entering passive gravity filtration apparatus 100.

It is further recognized herein that separating at least a portion or percentage of first effluent E1 therefrom second effluent E2 enables discharge via outlet 112 to comprise a lower concentration, portion, or percentage of suspended substance SS and/or dissolved substance DS therein relative to effluent E entering passive gravity filtration apparatus 100.

Preferably, separation zone 162 and/or collection zone 163 is constantly flushed when first effluent E1 exits discharge pipe 182. The minimum rate of discharge required by discharge pipe 182 is the rate necessary to keep first effluent E1 from remixing with the cross-flow effluent E1.

Moreover, intermittently strong reverse polarity charge from electric power source 606 may be applied to separation charging grid 604 to clean one or more charge plates 608 of collected charged (negative) molecules or subcomponents 802. The released charged (negative) molecules or subcomponents 802 may be swept away by first effluent E1 exiting discharge pipe 182.

It is contemplated herein that one or more charge plates 608 may be arranged as parallel plates to allow for electrical contact thereto effluent E with a minimum of disturbance, however, other configurations, sizes, and dimensions are included herein to maintain broad, flat, calm, water column of effluent E to provide maximum separation efficiency.

It is further contemplated herein that one or more charge plates 608 (whether positive or negative charged) may include other configurations, thickness, size, dimensions and position therein passive gravity filtration apparatus 100.

Separation charging grid 604 may include height or vertical adjustment device 700 to enable height adjustment of separation charging grid 604 therein separation zone 162 and/or collection zone 163. Vertical adjustment device 700 may include one or more insulated rails or supports positioned proximate one or more walls, such as front sidewall 140, floor 124, left or first sidewall 131, right or second sidewall 132, and back sidewall 133 or more specifically may include first support 701 positioned proximate vertical section 143 of interior surface 104 and second support 702 positioned proximate back sidewall 133 of interior surface 104. One or more sections of separation charging grid 604 may be adjustably affixed thereto at least one of vertical adjustment device 700 via a fastener, such as pinch bolt 703. Pinch bolt 703 may be adjusted up and/or down one of the one or more supports, such as first support 701 or second support 702 to change the vertical position or height of separation charging grid 604 relative to floor 124.

It is contemplated herein that the optimum vertical position of separation charging grid 604 therein separation zone 162 and/or collection zone 163 relative to the flow of effluent E will be dependent on volume of flow of effluent E in inlet 110 and concentration of suspended substance SS and/or dissolved substance DS.

It is further contemplated herein that variables regarding passive gravity filtration apparatus 100, such as height adjustment of separation charging grid 604 therein separation zone 162 and/or collection zone 163, the quantity of effluent E entering inlet 110, the condition of effluent E entering inlet 110 (heavier), the amount of first effluent E1 exiting discharge pipe 182, as well as the amount of voltage/current applied to inlet charging grid 602 and/or separation charging grid 604, each cell is variable allows for tuning the efficiency of removal of first effluent E1 (suspended substance SS and/or dissolved substance DS) from effluent E.

It is further contemplated herein that charged (negative) molecules or subcomponents 802 that traversed second separation zone 162.2 and second collection zone 163.2 (i.e. not pulled down into first separation zone 162.1 or first collection zone 163.1) by separation charging grid 604 may come in range of subsequent or downstream passive gravity filtration apparatus' 100 inlet charging grid 602 (negative) electrical field. Subsequent or downstream passive gravity filtration apparatus' 100 inlet charging grid 602 (negative) electrical field preferably repels charged (negative) molecules or subcomponents 802 pushes, via repelling force from (negative) electrical field, charged (negative) molecules or subcomponents 802 under lip 172 and into first separation zone 162.1 or first collection zone 163.1.

Figure 7:
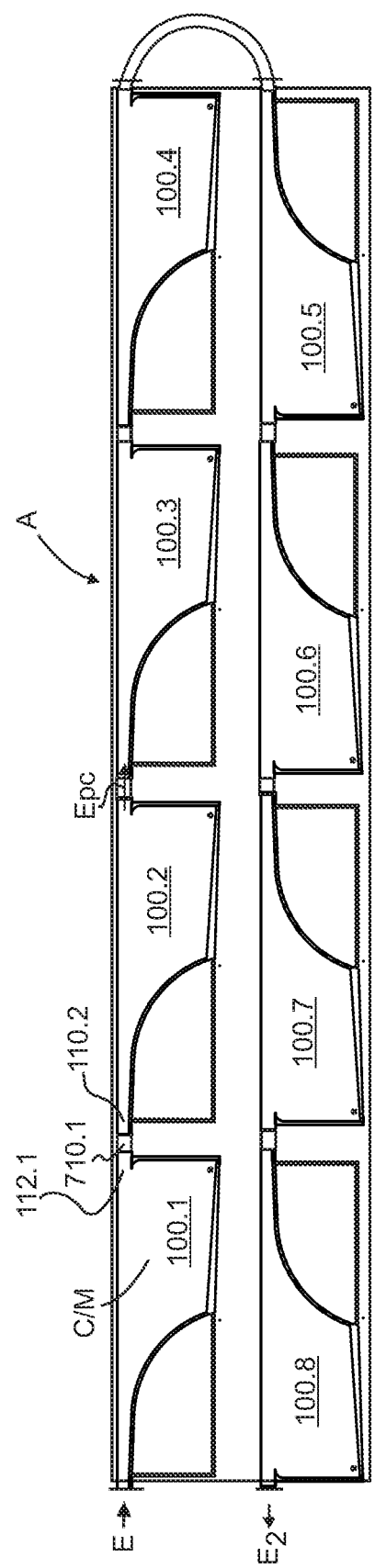
FIG. 7 is a side view of an exemplary embodiment of a plurality of passive gravity filters, according to FIG. 1, joined together in series.

Referring now to FIG. 7, by way of example, and not limitation, there is illustrated an example embodiment of two or more passive gravity filtration apparatus 100 in series as multi-modules or cells C/M forming array A. For, example, first passive gravity filtration apparatus 100.1 outlet 112.1 may be coupled or joined via a joiner or coupler, such as mating flange 710.1 to inlet 110.2 of second passive gravity filtration apparatus 100.2 and so on for two or passive gravity filtration apparatus 100.

It is recognized herein that two or more passive gravity filtration apparatus 100 of the series of modules or cells, such as first passive gravity filtration apparatus 100.1, second passive gravity filtration apparatus 100.2, third passive gravity filtration apparatus 100.3, fourth passive gravity filtration apparatus 100.4, fifth passive gravity filtration apparatus 100.5, sixth passive gravity filtration apparatus 100.6, seventh passive gravity filtration apparatus 100.7, and eighth passive gravity filtration apparatus 100.8 in a four-by-four stacked configuration. Moreover, one or more rows of two or more passive gravity filtration apparatus 100 of the series of modules or cells may be configured.

It is recognized herein that each passive gravity filtration apparatus 100 of the series of modules or cells, such as first passive gravity filtration apparatus 100.1 and second passive gravity filtration apparatus 100.2 is only required to do a part of the reduction or filtering process and that collectively two or more passive gravity filtration apparatus 100 working in series has a greater sum total reduction or filtering capability. Moreover, individual modules or cells C/M may be tuned or customized to perform a specific reduction or filtering and such feature enables overall reduction or filtration process to be greatly optimized. Moreover, some or all modules or cells C/M of array A may or may not have integrated therein charged particle precipitation apparatus 600 functionality.

These units will enable the clarifier to remove elements that are dissolved particulate into the water, dissolved substance DS, not just suspended solids, suspended substance SS.

For example, a cell or module C/M in the early part of the array A will see water of the highest (most conductive) salinity, and would require less current and more discharge via discharge pipe 182 than a cell at the end of the array A where the water has much less salinity (less conductive) and would require more current and less discharge via discharge pipe 182. Because towards the end of array A where the water is much less conductive, (far fewer salt molecules), the requirement would be more current but less discharge. Thus the process is "tunable" adjustable in virtually all parameters. Optimizing each cell or module C/M will greatly enhance overall efficiency of array A.

Moreover, individual cell or module C/M may be added or subtracted, and once in place tailored to deal with the load presented at that point in the system of array A. These adjustments can be made after the system is in operation to optimize performance. Importantly, the entire array A is portable requiring no permanent infrastructure.

It is important to note that discharge via discharge pipe 182 or "return" water should not exceed 50% of overall flow entering first passive gravity filtration apparatus 100.1. FIG. 7 represents a filtration system with a capacity of approximately three million gallons per day. This would mean a system of sixteen (16) cells or modules C/M in two side-by-side rows of eight (8) each that would fit in a standard shipping container and may produce approximately one and one half (1.5) million gallons per day of fresh water.

It is contemplated herein that first passive gravity filtration apparatus 100.1 may include first Charged particle precipitation apparatus 600.1 and second passive gravity filtration apparatus 100.2 may include second charged particle precipitation apparatus 600.2 and so on for two or more passive gravity filtration apparatuses 100 with integrated charged particle precipitation apparatus 600 and configured as two or more passive filter cells.

Figure 8:
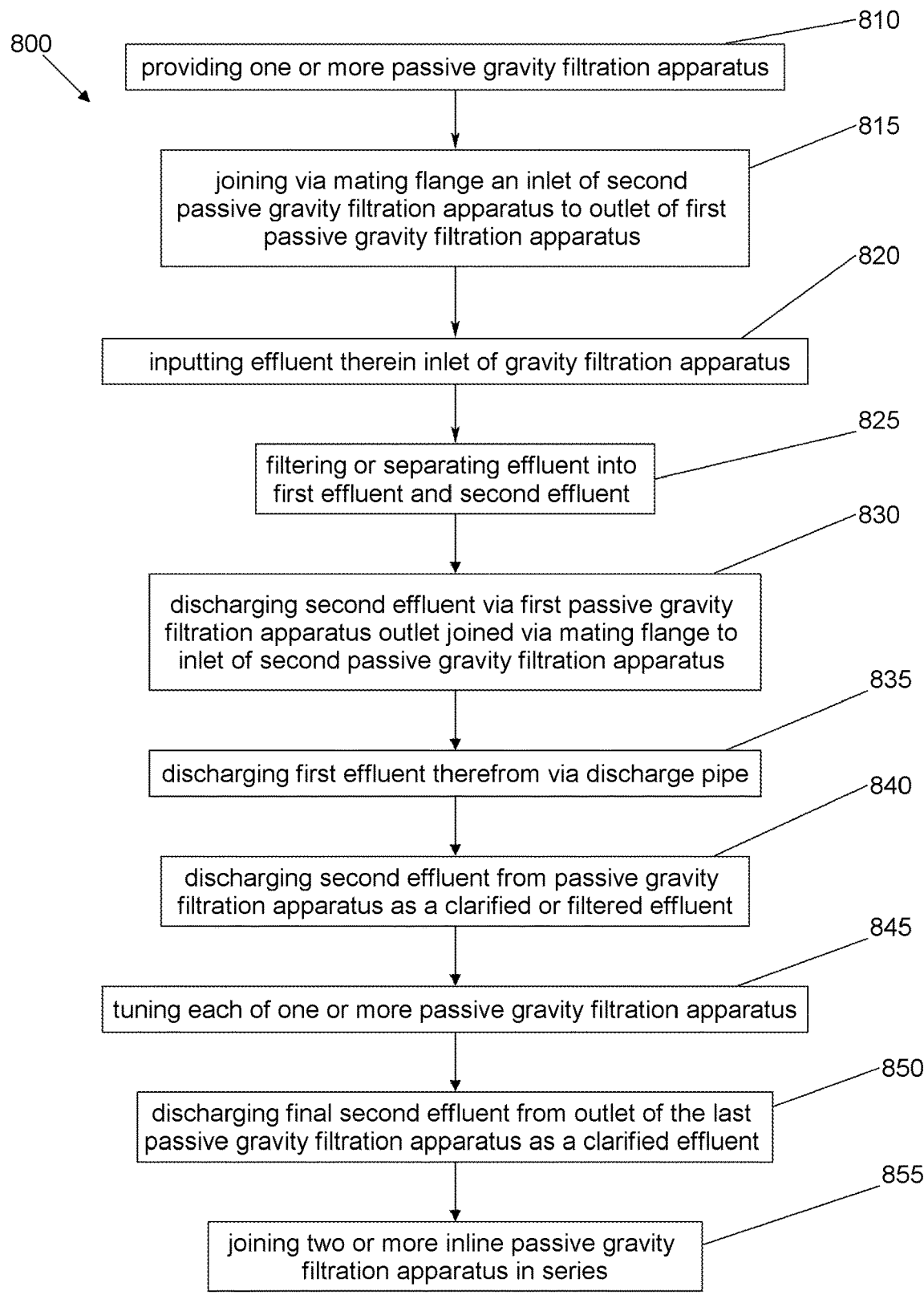
FIG. 8 is a flow diagram of a method of filtering a portion of suspended substances and/or dissolved substances from an effluent.

Referring now to FIG. 8, there is illustrated a flow diagram 800 of a method of use of one or more passive gravity filtration apparatus 100 in series as multi-modules or cells C/M forming array A. In block or step 810, providing one or more passive gravity filtration apparatus 100, wherein one or more modules or cells C/M forming array A includes charged particle precipitation apparatus 600 therein. In block or step 815, coupling or joining via a joiner or coupler, such as mating flange 710 inlet 110.($n$+1) of second passive gravity filtration apparatus 100.($n$+1) to outlet 112($n$) of first passive gravity filtration apparatus 100.($n$) and so on for two or more passive gravity filtration apparatus 100. In block or step 820, inputting effluent E therein inlet 110.1 of gravity filtration apparatus 100. In block or step 825, filtering or separating effluent E into first effluent E1 and second effluent E2 as provided herein in FIGS. 1-7 in each of modules or cells C/M forming array A of passive gravity filtration apparatus 100(1-n). In block or step 830, discharging second effluent E2 (low concentration filtered effluent) via first passive gravity filtration apparatus 100.1 outlet 112.1 coupled or joined via a joiner or coupler, such as mating flange 710 to inlet 110.1 of second passive gravity filtration apparatus 100.2, repeated for all other modules or cells C/M forming array A of passive gravity filtration apparatus 100 (1-n). In block or step 835, discharging first effluent E1 (high concentration effluent) therefrom discharge pipe 182 of first passive gravity filtration apparatus 100 and all other modules or cells C/M forming array A of passive gravity filtration apparatus 100(1-n). In block or step 840, discharging second effluent E2 from passive gravity filtration apparatus 100 as a partially clarified effluent Epc filtered of a concentration, portion, or percentage of suspended substance SS and/or dissolved substance DS. In block or step 845, tuning each of one or more passive gravity filtration apparatus 100 in series as multi-modules or cells C/M forming array A to optimize filtration process of array A. In block or step 850, discharging final second effluent E2 from outlet 112 of the last module or cell C/M forming array A of passive gravity filtration apparatus 100(1-n) as a clarified effluent Ec filtered of a greater concentration, portion, or percentage of suspended substance SS and/or dissolved substance DS than may be accomplished by a single passive gravity filtration apparatus 100 with all the advantages set forth herein. In block or step 855, joining two or more inline passive gravity filtration apparatus 100.n may be linked or connected via joining flange 710.n utilized to couple first outlet 112.1 of first passive gravity filtration apparatus 100.1 thereto second inlet 110.2 of second passive gravity filtration apparatus 100.2 in series.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A passive filter cell for filtering an effluent with suspended substances and dissolved substances, the passive filter cell comprising:
    a basin with a floor and two or more upright sidewalls forming a channel having a first sidewall, a second sidewall, back sidewall, and a front sidewall, said floor is configured on an angle from said front sidewall to said back sidewall, wherein said floor is configured on an angle sloped from said first sidewall to said second sidewall;
    an inlet positioned proximate a top of said front sidewall to receive the effluent and an outlet positioned proximate said top of said back sidewall to exit the effluent, wherein said front sidewall is downwardly curved from said inlet to said floor, wherein said inlet is configured as narrow in a height and configured as wide in a width to narrow the effluent;
    a discharge pipe positioned proximate a junction between said floor and said back sidewall, wherein said discharge pipe includes a valve; and
    a charged particle precipitation apparatus positioned proximate said front sidewall.

2. The passive filter cell of claim 1, further comprises a lip configured to extend from said top of said back sidewall into an interior of said basin.

3. The passive filter cell of claim 1, wherein said outlet is configured as narrow in a height and configured as wide in a width to narrow the effluent.

4. The passive filter cell of claim 2, wherein said lip projects opposite a flow of the effluent.

5. The passive filter cell of claim 4, wherein said discharge pipe is positioned proximate a junction between said floor, said back sidewall, and said second sidewall.

6. The passive filter cell of claim 5, further comprises a receiving zone for the effluent, said receiving zone positioned proximate said inlet.

7. The passive filter cell of claim 6, further comprises a separation zone for the effluent, said separation zone positioned proximate said front sidewall.

8. The passive filter cell of claim 7, further comprises a settling zone for the effluent, said settling zone positioned proximate said floor and said back sidewall.

9. The passive filter cell of claim 8, wherein said separation zone separates the effluent into a first effluent and a second effluent, wherein said first effluent contains a heavier particulate than said second effluent.

10. The passive filter cell of claim 9, wherein said first effluent contains a higher concentration of a suspended substance.

11. The passive filter cell of claim 10, wherein said second effluent contains a lower concentration of said suspended substance.

12. The passive filter cell of claim 11, wherein said lip is configured to hold said first effluent therein said settling zone.

13. The passive filter cell of claim 12, wherein said discharge pipe discharges said first effluent.

14. The passive filter cell of claim 13, wherein said outlet discharges said second effluent.

15. The passive filter cell of claim 14, further comprises a skimmer positioned proximate said top between said inlet and said outlet, said skimmer configured to skim floating substances from said second effluent.

16. The passive filter cell of claim 15, further comprises at least a first passive filter cell and at least a second passive filter cell, wherein said outlet of said first passive filter cell is joined thereto said inlet of said second passive filter cell.

17. The passive filter cell of claim 16, wherein said outlet of said first passive filter cell is joined thereto said inlet of said second passive filter cell by a joining flange.

18. The passive filter cell of claim 7, further comprises an inlet charging grid positioned proximate said inlet.

19. The passive filter cell of claim 18, wherein said inlet charging grid further comprises at least one first charge plate.

20. The passive filter cell of claim 19, further comprises a separation charging grid positioned proximate said separation zone.

21. The passive filter cell of claim 20, wherein said separation charging grid further comprises at least one second charge plate.

22. The passive filter cell of claim 21, further comprises a power supply, said power supply includes a positive output terminal electrically connected to said separation charging grid further and a negative output terminal electrically connected to said inlet charging grid.

23. The passive filter cell of claim 22, wherein said charged particle precipitation apparatus separates the effluent into a first negative charged effluent and a second non-negative charged effluent, wherein said first negative charged effluent contains a higher concentration of a dissolved substance than said second non-negative charged effluent.

24. The passive filter cell of claim 23, wherein said first negative charged effluent contains a higher concentration of a dissolved substance.

25. The passive filter cell of claim 24, wherein said second non-negative charged effluent contains a lower concentration of said dissolved substance.

26. The passive filter cell of claim 25, wherein said discharge pipe discharges said first negative charged effluent.

27. The passive filter cell of claim 26, wherein said outlet discharges said second non-negative charged effluent.

28. The passive filter cell of claim 27, further comprises a vertical adjustment device positioned between said separation charging grid and at least one of said first sidewall, said second sidewall, and said back sidewall, said vertical adjustment device is configured to enable height adjustment of said separation charging grid relative to said floor.

* * * * *